US011198336B2

(12) United States Patent
Sekizawa et al.

(10) Patent No.: US 11,198,336 B2
(45) Date of Patent: Dec. 14, 2021

(54) TRANSMISSION AND RECEIVING ARRANGEMENT FOR A TIRE PRESSURE DETECTION DEVICE

(71) Applicant: DENSO CORPORATION, Kariya (JP)

(72) Inventors: Takatoshi Sekizawa, Kariya (JP); Nobuya Watabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 41 days.

(21) Appl. No.: 16/860,049

(22) Filed: Apr. 27, 2020

(65) Prior Publication Data

US 2020/0254830 A1 Aug. 13, 2020

Related U.S. Application Data

(63) Continuation of application No. PCT/JP2018/039897, filed on Oct. 26, 2018.

(30) Foreign Application Priority Data

Oct. 30, 2017 (JP) .............................. JP2017-209400

(51) Int. Cl.
*B60C 23/04* (2006.01)
*G01L 17/00* (2006.01)

(52) U.S. Cl.
CPC ...... *B60C 23/0455* (2013.01); *B60C 23/0454* (2013.01); *B60C 23/0474* (2013.01); *B60C 23/0488* (2013.01); *G01L 17/00* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/20; B60C 23/0444; B60C 23/0462; B60C 11/24;
(Continued)

(56) References Cited

U.S. PATENT DOCUMENTS 7,696,861 B2 * 4/2010 Mori ................... B60C 23/0416
340/426.33
7,791,460 B2 * 9/2010 Watabe ............... B60C 23/0464
340/442
(Continued)

FOREIGN PATENT DOCUMENTS

JP      4692068 B2 *   6/2011   ......... B60C 23/0488
JP      4924189 B2 *   4/2012   ........... B60C 23/044
(Continued)

*Primary Examiner* — Andre J Allen
(74) *Attorney, Agent, or Firm* — Harness, Dickey & Pierce, P.L.C.

(57) ABSTRACT

A tire air pressure detection device includes a plurality of transceivers and a receiver. The plurality of transceivers are correspondingly provided in a plurality of wheels of a vehicle. Each wheel has a tire. The receiver is attached to a vehicle body. Each of the plurality of transceivers outputs a detection signal indicative of an air pressure of the tire of the corresponding wheel. Each of the plurality of transceivers processes the detection signal, and generates a frame storing the processed detection signal as data related to the air pressure of the tire. The receiver receives the frame. The receiver detects the air pressure of the tire based on the data stored in the received frame.

6 Claims, 7 Drawing Sheets

(58) Field of Classification Search
CPC . B60C 23/064; B60C 23/007; B60C 23/0479; B60C 23/062; B60C 23/003; B60C 23/0401; B60C 23/0413; B60C 23/0488; B60C 23/0498; B60C 23/043; B60C 23/06; B60C 23/0452; B60C 23/0467; B60C 11/246; B60C 23/02; B60C 99/006; B60C 23/0428; B60C 23/0442; B60C 23/009; B60C 23/0425; B60C 2019/004; B60C 23/004; B60C 11/243; B60C 23/045; B60C 23/0464; B60C 23/0472; B60C 23/066; B60C 23/0403; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/0483; B60C 11/0318; B60C 23/0459; B60C 23/0471; B60C 23/0481; B60C 23/042; B60C 23/12; B60C 2019/005; B60C 23/002; B60C 23/0422; B60C 23/0423; B60C 23/0466; B60C 2202/02; B60C 23/0405; B60C 23/0477; B60C 29/06; B60C 13/001; B60C 23/0476; B60C 25/132; B60C 23/0437; B60C 23/0447; B60C 23/0427; B60C 23/0449; B60C 25/00; B60C 9/18; B60C 13/00; B60C 19/003; B60C 23/065; B60C 23/0484; B60C 23/0486; B60C 23/08; B60C 17/00; B60C 2019/006; B60C 23/001; B60C 25/142; B60C 17/02; B60C 23/0445; B60C 5/004; B60C 11/0083; B60C 25/145; B60C 29/00; B60C 9/02; B60C 11/0332; B60C 23/0418; B60C 23/0457; B60C 25/18; B60C 11/13; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/04985; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/067; B60C 23/18; B60C 25/02; B60C 7/12; B60C 11/02; B60C 17/0009; B60C 19/002; B60C 19/08; B60C 19/12; B60C 2019/007; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06

USPC .................................................. 73/146–146.8

See application file for complete search history.

(56) References Cited

U.S. PATENT DOCUMENTS

| | | | | |
|---|---|---|---|---|
| 7,854,163 | B2* | 12/2010 | Mori | B60C 23/045 |
| | | | | 73/146 |
| 7,961,082 | B2* | 6/2011 | Watabe | B60C 23/0416 |
| | | | | 340/426.33 |
| 2003/0197604 | A1* | 10/2003 | Ogawa | B60C 23/0462 |
| | | | | 340/445 |
| 2010/0073157 | A1* | 3/2010 | Maehara | B60C 23/0433 |
| | | | | 340/447 |
| 2020/0255019 | A1* | 8/2020 | Sekizawa | B60T 8/1725 |

FOREIGN PATENT DOCUMENTS

| | | |
|---|---|---|
| JP | 2012210912 A | 11/2012 |
| JP | 2018184101 A | 11/2018 |
| WO | WO-2018199262 A1 | 11/2018 |
| WO | WO-2019088023 A1 | 5/2019 |
| WO | WO-2019088024 A1 | 5/2019 |

* cited by examiner

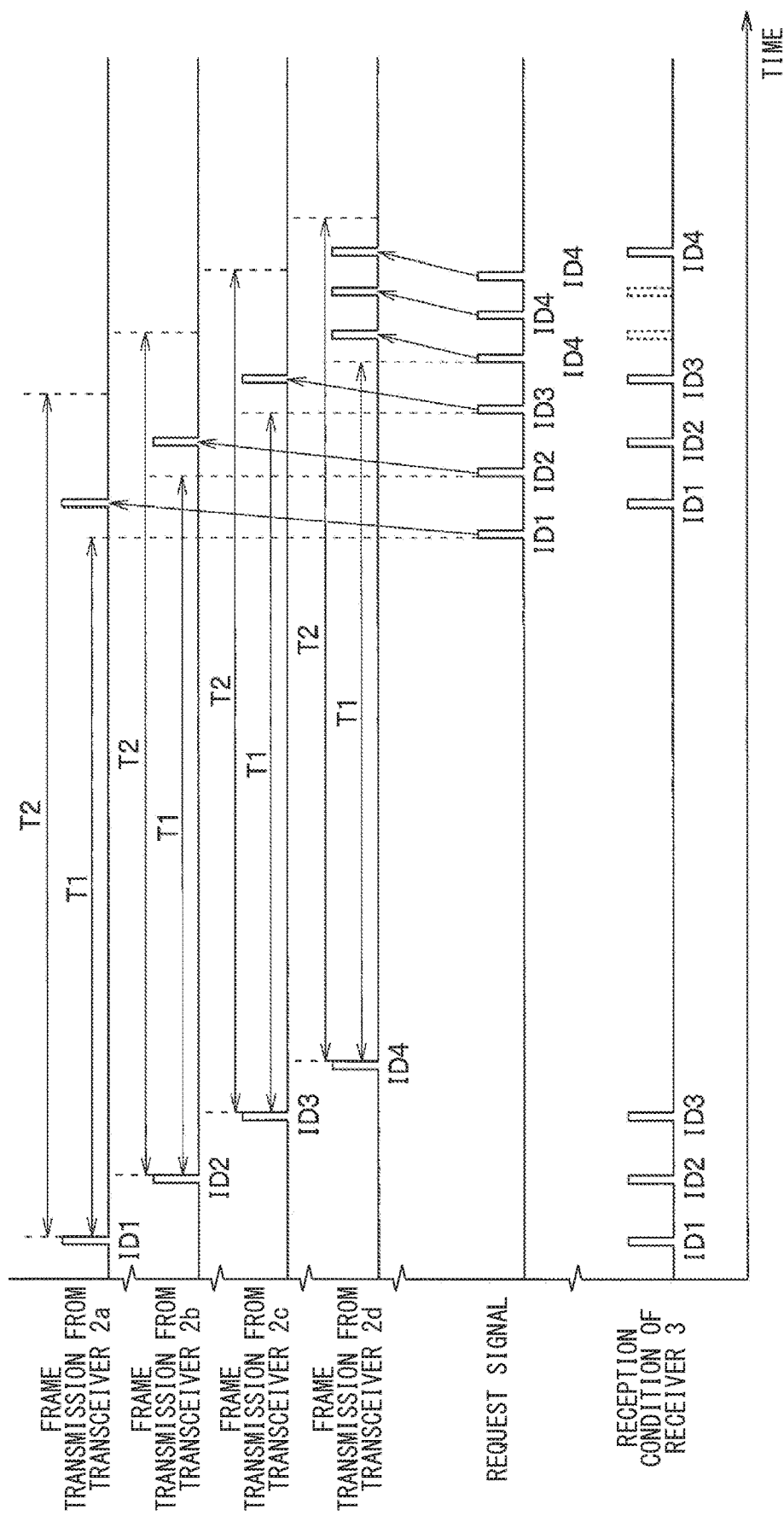

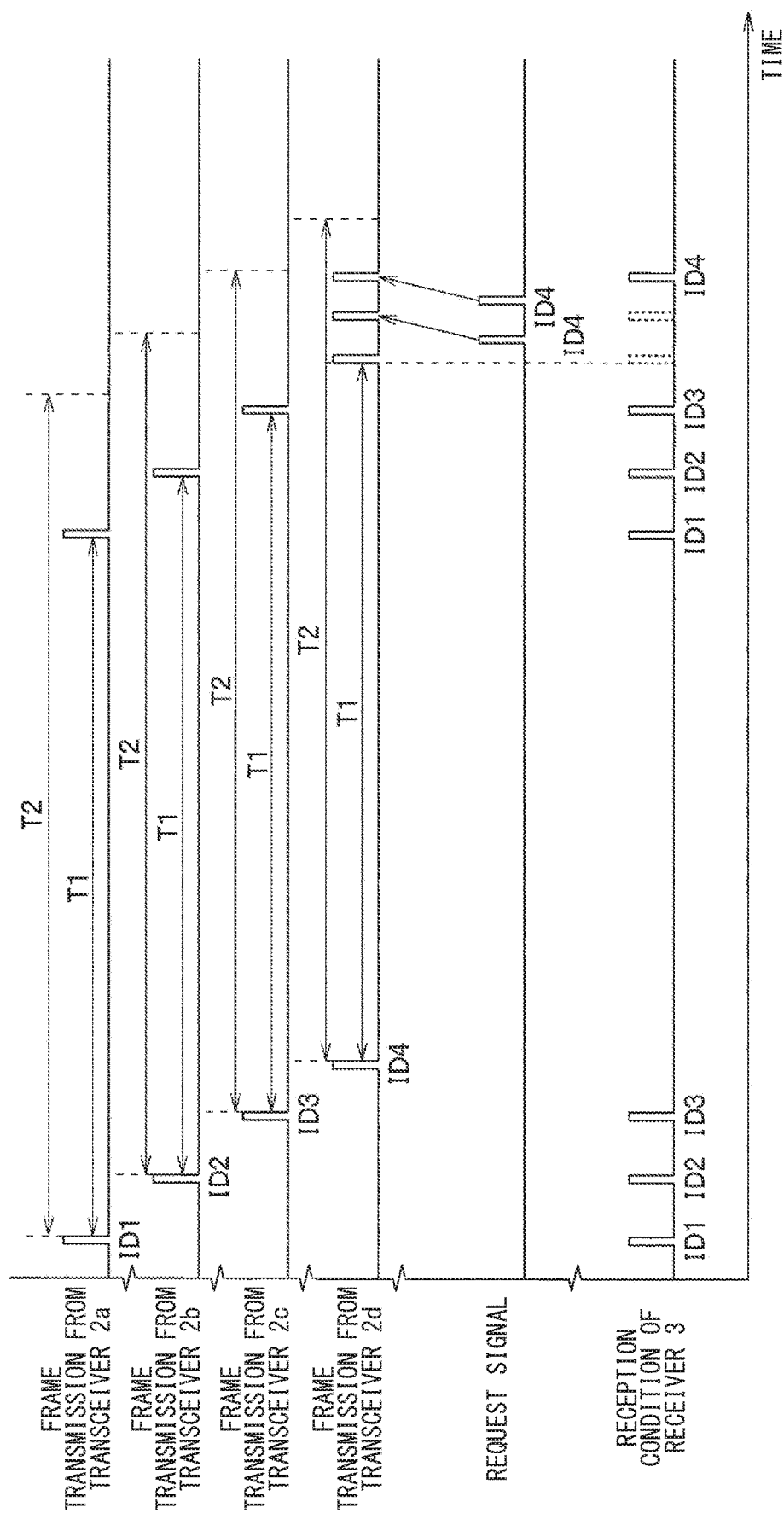

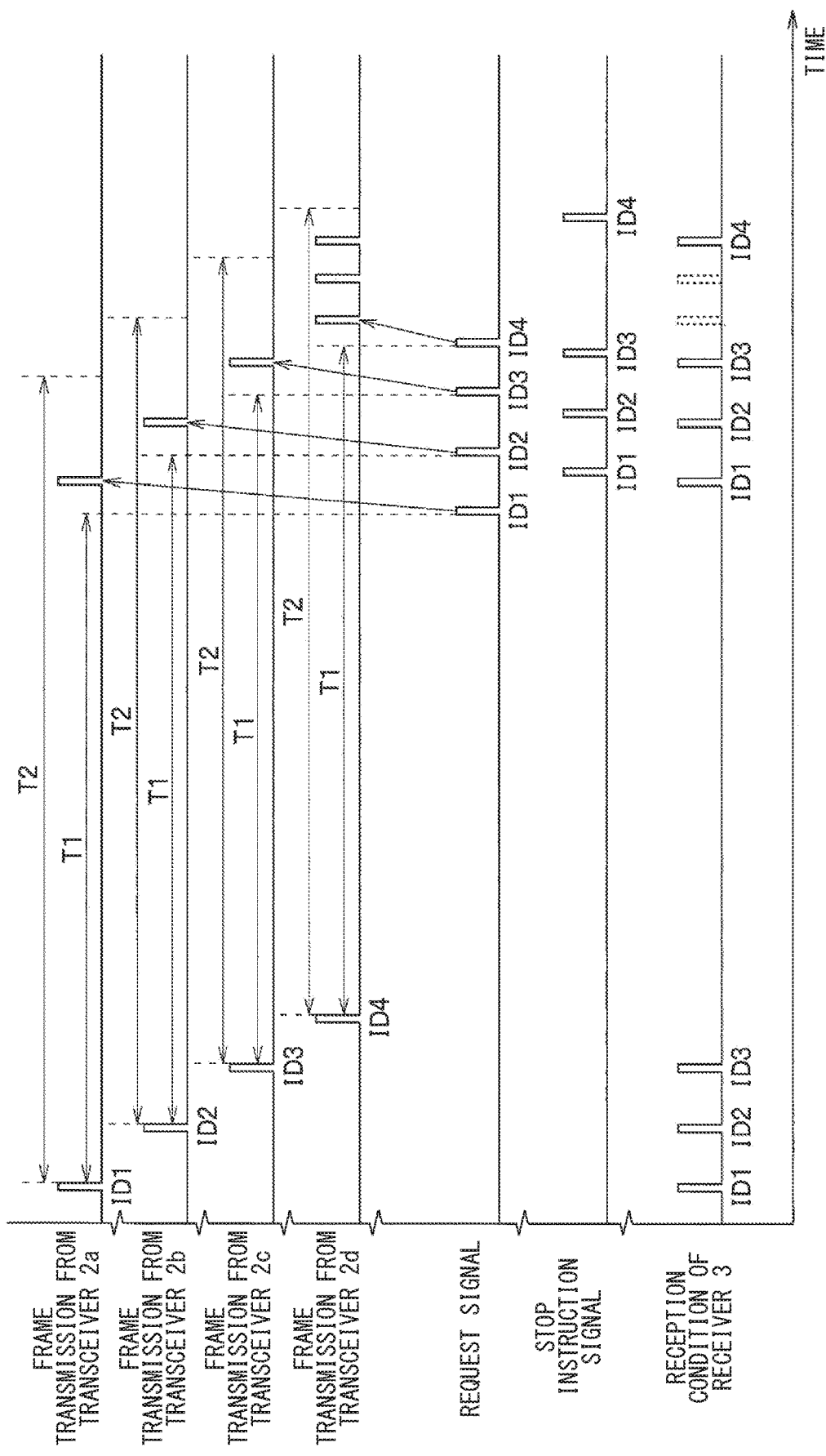

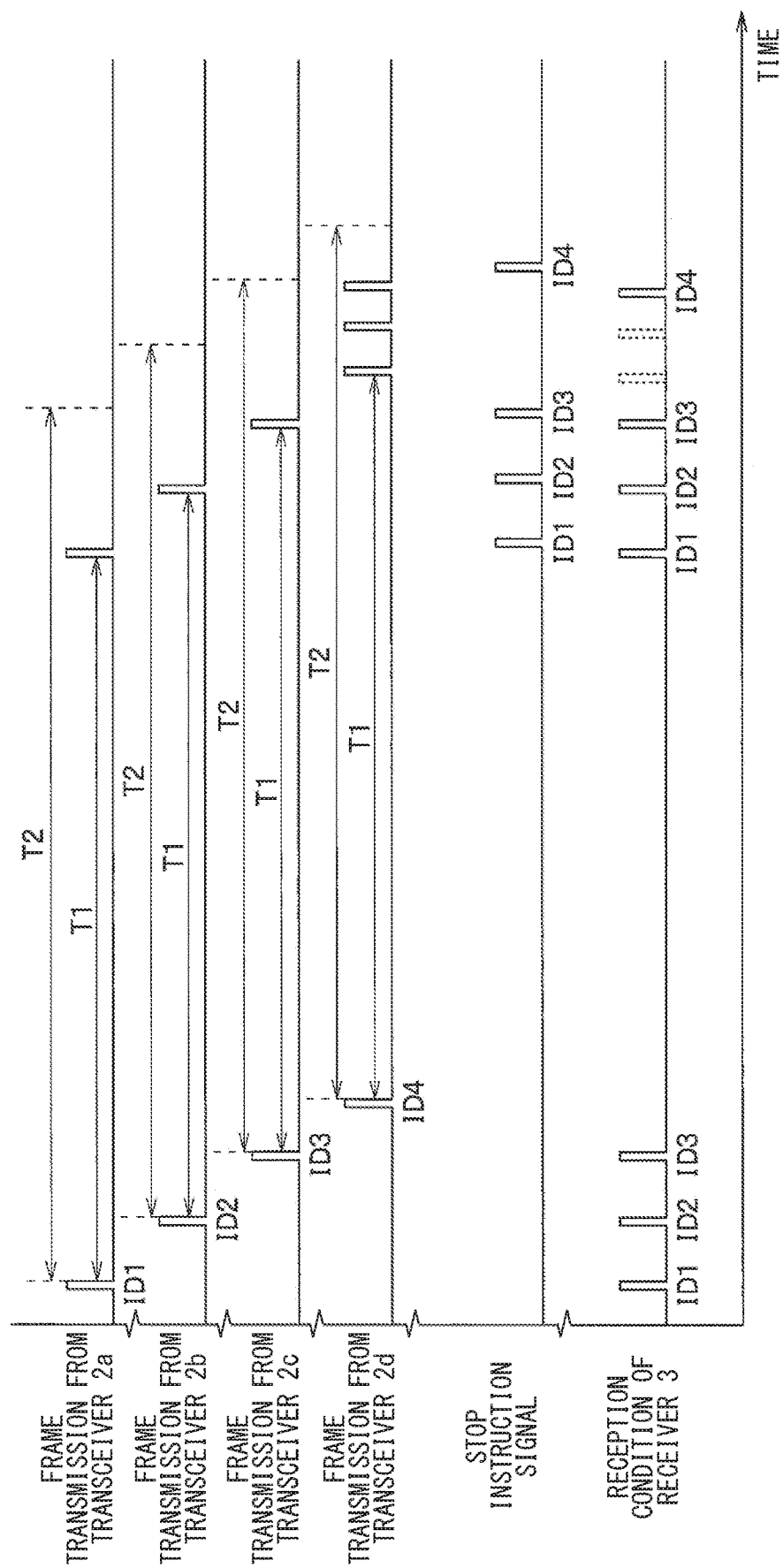

TRANSMISSION AND RECEIVING ARRANGEMENT FOR A TIRE PRESSURE DETECTION DEVICE

CROSS REFERENCE TO RELATED APPLICATIONS

The present application is a continuation application of International Patent Application No. PCT/JP2018/039897 filed on Oct. 26, 2018, which designated the U.S. and claims the benefit of priority from Japanese Patent Application No. 2017-209400 filed on Oct. 30, 2017. The entire disclosures of all of the above applications are incorporated herein by reference.

TECHNICAL FIELD

The present disclosure relates to a tire air pressure detection device.

BACKGROUND

For example, a tire air pressure detection device of a direct type as one of tire air pressure detection devices has been proposed. In this type of tire air pressure detection device, a transmitter including a sensing unit, such as a pressure sensor, is directly attached to a wheel mounting a tire, and an antenna and a receiver are attached to a vehicle body. When data indicative of a detection result of the pressure sensor is transmitted from the transmitter, the data is received by the receiver through the antenna, thereby detecting an air pressure of the tire.

SUMMARY

The present disclosure provides a tire air pressure detection device. The tire air pressure detection device includes a plurality of transceivers and a receiver. The plurality of transceivers are correspondingly provided in a plurality of wheels of a vehicle. Each wheel has a tire. The receiver is attached to a vehicle body. Each of the plurality of transceivers outputs a detection signal indicative of an air pressure of the tire of the corresponding wheel. Each of the plurality of transceivers processes the detection signal, and generates a frame storing the processed detection signal as data related to the air pressure of the tire. The receiver receives the frame. The receiver detects the air pressure of the tire based on the data stored in the received frame.

BRIEF DESCRIPTION OF DRAWINGS

The features and advantages of the present disclosure will become more apparent from the following detailed description made with reference to the accompanying drawings. In the drawings:

FIG. 6A is a time chart illustrating an operation example of the tire air pressure detection device according to the first embodiment;

FIG. 7 is a time chart illustrating an operation example of a tire air pressure detection device according to a second embodiment;

FIG. 8 is a time chart illustrating an operation example of a tire air pressure detection device according to a third embodiment; and FIG. 9 is a time chart illustrating an operation example of a tire air pressure detection device described in a modification of the third embodiment.

DETAILED DESCRIPTION

Figure 1:
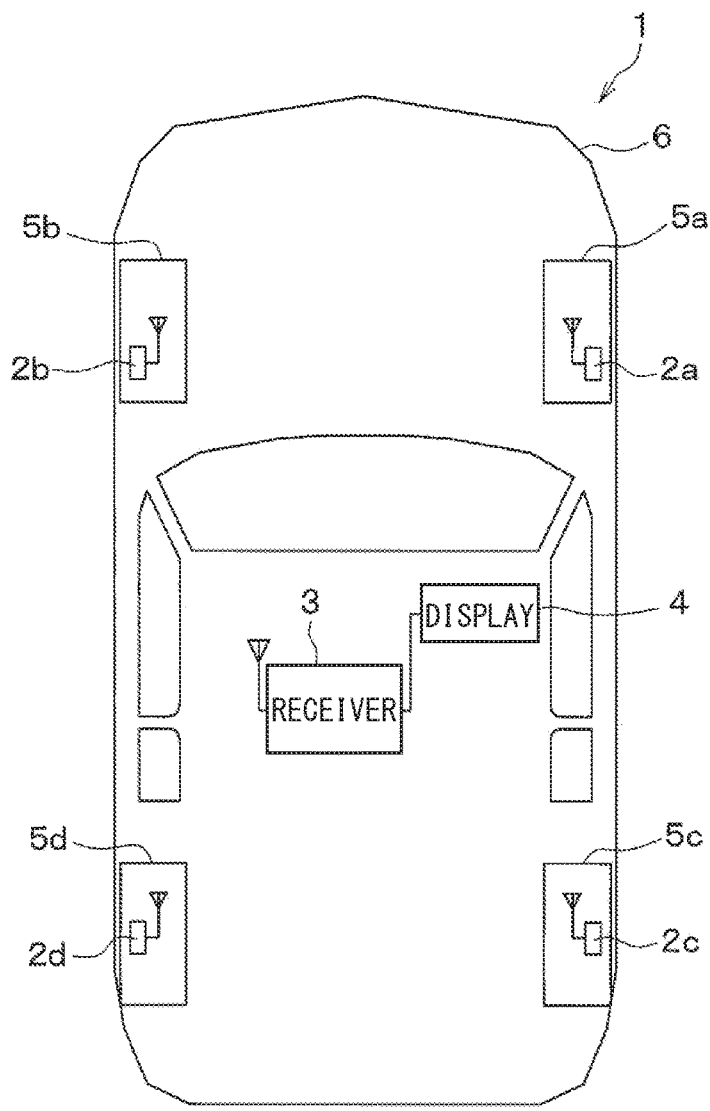
FIG. 1 is a diagram illustrating an entire configuration of a tire air pressure detection device according to a first embodiment.

In a tire air pressure detection device of a direct type, it is necessary to accurately transmit data from a transmitter of a tire to a receiver of a vehicle body. Since the data is transmitted to the receiver from the transmitter through unidirectional communication, the tire air pressure detection device is designed to increase transmission number of the data, that is, frequently transmits the data. Thus, the tire air pressure detection device can reduce a situation in which the data is not received to the receiver.

For example, the North American legislation requires an alert within 20 minutes when the tire air pressure decreases. For this reason, the transmission frequency is set to satisfy the condition that the data reception rate at the receiver within 20 minutes is equal to or more than 99%.

In the direct-type tire air pressure detection device, since the transmitter is attached to the tire, a battery, such as a button battery is used as a power source. With the increase of the transmission number by the transmitter, battery life may decrease. Thus, it is necessary to set the transmission frequency in which the receiver surely receives the data and the battery life is secured. However, it is difficult to satisfy the both conditions.

The present disclosure provides a tire air pressure detection device that can improve battery life and surely perform data reception at a receiver.

An example embodiment of the present disclosure provides a tire air pressure detection device including a plurality of transceivers and a receiver. The plurality of transceivers are correspondingly provided in a plurality of wheels of a vehicle. Each wheel has a tire. The receiver is attached to a vehicle body. Each of the plurality of transceivers includes a sensing unit, a first controller, and a first transceiver unit. The sensing unit has a pressure sensor configured to output a detection signal indicative of an air pressure of the tire of the corresponding wheel. The first controller is configured to process the detection signal, and generate a frame storing the processed detection signal as data related to the air pressure of the tire. The first transceiver unit is configured to receive a request signal transmitted from the receiver, and transmit the frame in response to the request signal. The receiver includes a second transceiver unit and a second controller. The second transceiver unit is configured to transmit the request signal, and receive the frame. The second controller is configured to detect the air pressure of the tire based on the data stored in the received frame, and control the second transceiver unit to transmit the request signal. The second controller causes the second transceiver unit to transmit the request signal to each of the plurality of transceivers at a time point within every request time period predetermined for each of the plurality of transceivers. The second controller causes the second transceiver unit to stop transmission of the request signal to, among the plurality of transceivers, one from which the frame has been received, and repeat transmission of the request signal to, among the plurality of transceivers, one from which the frame has not been received.

In the example embodiment of the present disclosure, bi-directional communication is achieved between the transceiver and the receiver. Thus, the transceiver can transmit the frame in response to the request signal transmitted from the receiver. When the receiver cannot receive the frame, the request signal is output from the receiver again, thereby informing the transceiver of this situation. Then, the receiver transmits the request signal every request time period which has been set based on the specified time period defined by the legislation or the like, causing each of the transceivers to perform the frame transmission in response to the request signal.

In this configuration, the frame reception can be surely performed within the specified time period. Each transceiver needs to perform the frame transmission in response to the reception of the request signal, thereby making it possible to reduce the frequency of frame transmission. Therefore, the tire air pressure detection device can improve battery life and surely perform data reception at the receiver.

The following will describe embodiments of the present disclosure based on the drawings. Note that, in the following description of the individual embodiments, like or equivalent component parts are given like reference characters or numerals.

First Embodiment

A first embodiment of the present disclosure will be described in detail with reference to FIGS. 1 to 5. In FIG. 1, the upper direction on the page corresponds to the front of a vehicle 1, the lower direction on the page corresponds to the rear of the vehicle 1, and the left-right direction on the page corresponds to the left-right direction of the vehicle.

A tire air pressure detection device shown in FIG. 1 is attached to the vehicle 1 and includes transceivers 2a to 2d, a receiver 3, and a display 4.

As shown in FIG. 1, the transceivers 2a to 2d are attached to respective wheels 5a to 5d of the vehicle 1. The transceivers 2a to 2d detect the air pressures of respective tires attached to the wheels 5a to 5d, store data related to detection signals indicative of the detection results in frames, and transmit the data. The receiver 3 is attached to a vehicle body 6 of the vehicle 1. The receiver 3 receives the frames transmitted from the transceivers 2a to 2d and detects the tire air pressures by performing various processing, calculation, or the like based on the detection signals stored in the frames. The transceivers 2a to 2d and the receiver 3 according to the present embodiment may perform bidirectional communication which enables not only communication from the transceiver 2a to 2d to the receiver 3 but also communication from the receiver 3 to the transceiver 2a to 2d. Thus, the receiver 3 is capable of requesting the transceivers 2a to 2d to perform the frame transmission. Various types of bidirectional communication can be applied. For example, Bluetooth communication including BLE (Bluetooth Low Energy) communication, wireless LAN (Local Area Network) such as wifi, Sub-GHz communication, ultra wideband communication, Zig Bee, or the like may be applied. Hereinafter, referring to FIGS. 2 and 3, the detailed configurations of the transceivers 2a to 2d and the receiver 3 will be described. It is noted that "Bluetooth" is a registered trademark.

Figure 2:
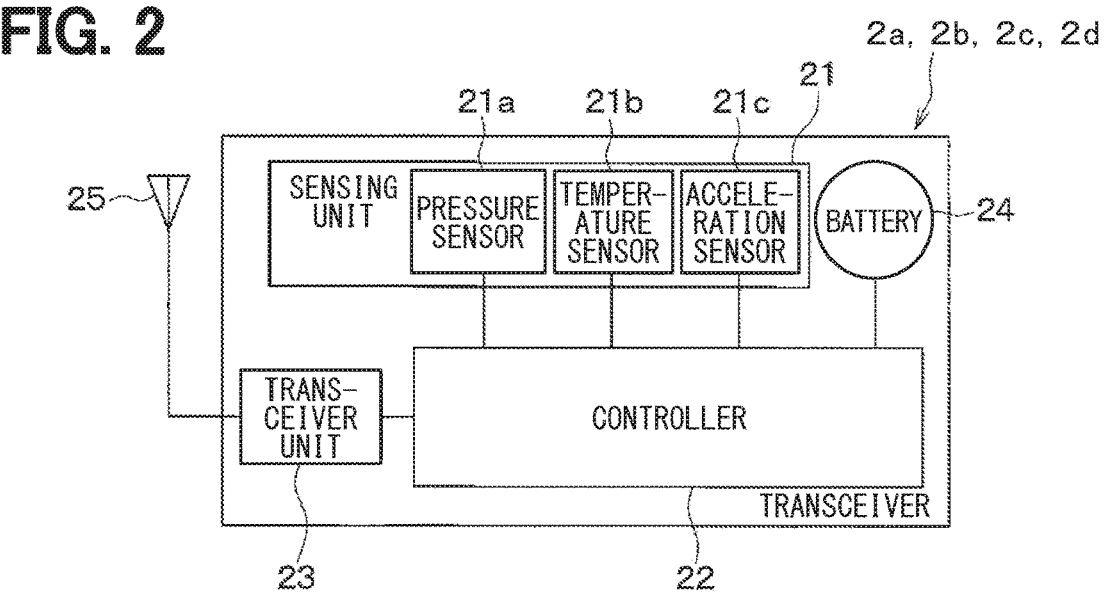
FIG. 2 is a block diagram illustrating a transceiver.

As shown in FIG. 2, each of the transceivers 2a to 2d includes a sensing unit 21, a controller 22, a transceiver unit 23, a battery 24, and an antenna 25, and each of these units is driven based on power supplied from the battery 24.

The sensing unit 21 may include, for example, a pressure sensor 21a, a temperature sensor 21b, and an acceleration sensor 21c. The pressure sensor 21a outputs a detection signal corresponding to a tire air pressure. The temperature sensor 21b outputs a detection signal corresponding to a tire interior temperature. The acceleration sensor 21c outputs a detection signal corresponding to an acceleration generated when the tire rotates, for example, an acceleration in the radial direction of a corresponding one of the wheels 5a to 5d. The sensing unit 21 transmits detection signals output from the pressure sensor 21a, the temperature sensor 21b, and the acceleration sensor 21c to the controller 22.

The detection signal corresponding to the tire air pressure and the detection signal corresponding to the tire interior temperature are used to detect the tire air pressure. The detection signal corresponding to the acceleration is used to detect whether the vehicle 1 is traveling.

The controller 22 corresponds to a first controller and is provided by a well-known microcomputer including a CPU, a ROM, a RAM, an I/O, and the like. The controller 22 executes predetermined processing in accordance with programs stored in a memory, such as the ROM. The memory in the controller 22 stores ID information that includes identification information unique to each of the transceivers for identifying the corresponding one of the transceivers 2a to 2d, and identification information unique to the vehicle for identifying the subject vehicle.

The controller 22 receives the detection signal output from the sensing unit 21, performs signal processing on the detection signal, and processes the signal as necessary. Then, the controller 22 stores, in the frame, the data indicative of the detection results of the tire interior temperature and the tire air pressure used for the detection of the tire air pressure, together with the ID information regarding the corresponding one of the transceivers 2a to 2d. The controller 22 transmits the frame to the transceiver unit 23 at a predetermined time point. The controller 22 may determine whether the tire air pressure decreases. In this case, the controller 22 also stores data indicating whether the tire air pressure decreases in the frame and transmits the data to the transceiver unit 23. For example, the controller 22 compares a tire air pressure obtained by being converted for a predetermined reference temperature, with a predetermined alert threshold value Th. When detecting that the tire air pressure is equal to or lower than the alert threshold value Th, the controller 22 stores data indicating the occurrence of a decrease in the tire air pressure in the frame.

In the description below, data indicative of the detection results of the tire air pressure and the tire interior temperature as well as data indicative of the presence or absence of occurrence of a decrease in the tire air pressure will be referred to as data related to the tire air pressure. However, the data related to the tire air pressure does not necessarily include all these data, and may include the data indicative of the detection results of the tire air pressure and the tire interior temperature or may include the data indicative of the presence or absence of occurrence of a decrease in the tire air pressure.

The controller 22 uses the detection result of the acceleration to determine whether or not the vehicle is traveling. For example, when the acceleration sensor 21c outputs the detection signal corresponding to the acceleration in the radial direction of a corresponding one of the wheels 5a to 5d, the controller 22 extracts a centrifugal acceleration component by removing a center-of-gravity acceleration component from the detection signal. Change in the centrifugal acceleration component indicates the rotation state of the tire. Thus, the controller 22 detects that the vehicle 1 is traveling based on the generation of the centrifugal acceleration component, or detects the vehicle speed based on the change in the centrifugal acceleration component.

The transceiver unit 23 functions as an output unit that transmits the frame transmitted from the controller 22 to the receiver 3 as an RF radio wave through the antenna 25. The transceiver unit 23 also functions as an input unit that receives an instruction signal from the receiver 3 as an RF radio wave. Although the transceiver unit 23 is provided herein as one component, the transmission unit and the reception unit may be separately provided. The transceiver unit 23 performs transmission and reception using, for example, the RF radio wave with a communication bandwidth of 300 MHz or 400 MHz. The processing for transmitting a signal from the controller 22 to the transceiver unit 23 is performed in accordance with the above-mentioned program. Once a request signal is transmitted from the receiver 3, processing for transmitting a signal from the controller 22 to the transceiver unit 23 is executed as described later.

The battery 24 supplies electric power to the sensing unit 21, the controller 22, and the like in order that the sensing unit 21 collects data related to the tire air pressure, and the controller 22 executes various calculations or the like.

The transceivers 2a to 2d are attached to, for example, air injection valves in the respective wheels, namely, the respective wheels 5a to 5d, and are arranged so that the sensing units 21 are exposed inside the respective tires. Thus, the transceivers 2a to 2d detect the tire air pressures of the respective wheels and transmit frames at predetermined time points through the antennas 25 provided in the respective transceivers 2a to 2d.

Figure 3:
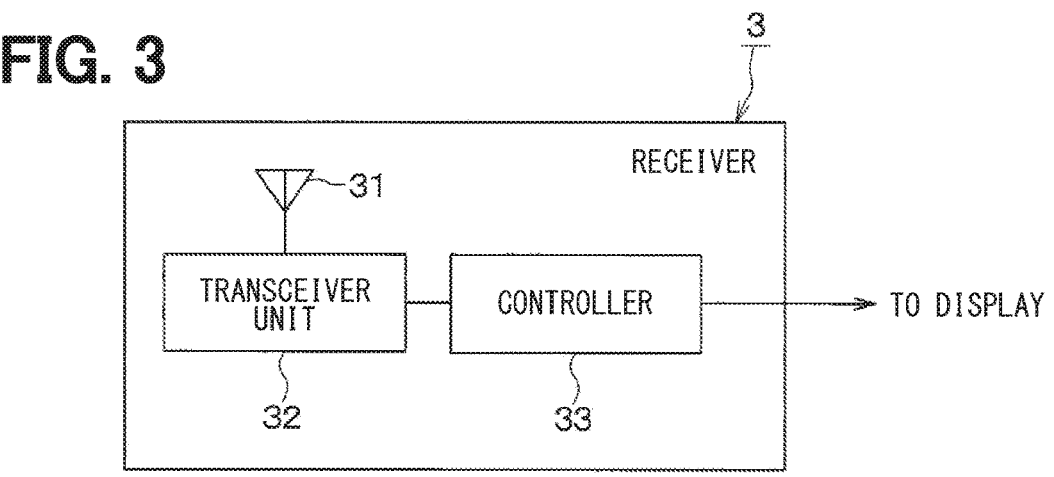
FIG. 3 is a block diagram illustrating a receiver.

As shown in FIG. 3, the receiver 3 includes an antenna 31, a transceiver unit 32, and a controller 33.

The antenna 31 is provided in the vehicle body 6. The antenna 31 receives the frames transmitted from the transceivers 2a to 2d and transmits request signals, which are instruction signals for causing the respective transceivers 2a to 2d to perform frame transmission. The antenna 31 herein is constituted of a single common antenna that collectively performs transmission and reception of the frame with respect to the respective transceivers 2a to 2d. Alternatively, the antenna 31 may be provided correspondingly to each of the transceivers 2a to 2d, or may be provided as separate antennas for transmission and reception.

When the frames transmitted from the respective transceivers 2a to 2d are received by the antenna 31, the transceiver unit 32 functions as an input unit that receives the frame and transmits the received frame to the controller 33. The transceiver unit 32 also functions as an output unit that transmits a request signal for transmitting the frame to each of the transceivers 2a to 2d in accordance with an instruction from the controller 33. The transceiver unit 32 is described herein to have a configuration capable of performing both transmission and reception. Alternatively, the transceiver unit 32 may be separately constituted of a transmission unit and a reception unit.

The controller 33 corresponds to a second controller and includes a well-known microcomputer including a CPU, a ROM, a RAM, an I/O, and the like. The controller 33 executes various processing in accordance with programs stored in the ROM or the like. Specifically, the controller 33 operates based on supply of electric power from a battery (not shown) to perform frame reception and control of a request signal in the transceiver unit 32 and also to perform various processing associated with the detection of the tire air pressure.

For example, the controller 33 performs reception confirmation processing, pressure detection processing, and the like as various processing associated with the detection of the tire air pressure.

In the reception confirmation processing, the controller 33 confirms that the frame transmitted from each of the transceivers 2a to 2d is received within a request time period. For example, the controller 33 has a clock (not shown), and confirms that the frame transmitted from each of the transceivers 2a to 2d is received within the required time period measured by the clock.

The term "request time period" as used herein refers to a time period during which a request signal is transmitted to each of the transceiver 2a to 2d when frame reception has not been performed. The "request time period" is set to, for example, a specified time period determined by the legislation or the like, or a shorter time period than the specified time period. Thus, at least one of the frames from each of the transceivers 2a to 2d can be received by the receiver 3 within the specified time period defined by the legislation or the like. In North America, the legislation has been determined to satisfy the reception rate of equal to or more than 99% within the time of 20 minutes. Thus, the specified time period is set to 20 minutes. In that case, the request time period is set to, for example, 20 minutes, which is the specified time period, or a shorter time period than the specified time period.

When a change in the tire air pressure occurs, data related to the tire air pressure is preferably acquired at shorter time intervals. Thus, when the controller 33 recognizes the change in the tire air pressure based on the result of pressure detection processing to be described later, the controller 33 sets a request time period, in the case of a decrease in the tire air pressure, to be even shorter than before the occurrence of the change, as the "request time period". For example, the controller 33 determines that the change in the tire air pressure occurs when a difference in the tire air pressure determined from data included in the previously received frame and the date included in the currently received frame exceeds a predetermined threshold value.

The controller 33 shifts to the pressure detection processing when the frame is received during the request time period. On the other hand, if the frame has not been received from one of the transceivers 2a to 2d, the controller 33 transmits a request signal for requesting the one of the transceivers 2a to 2d to transmit the frame. Specifically, the controller 33 transmits the request signal with ID information corresponding to the one of the transceivers 2a to 2d. Thus, the frame can be surely received by the receiver 3 within the specified time period.

The controller 33 sets the request time period based on a specified time period defined by the legislation or the like when a change in the tire air pressure does not occur. With this configuration, the frequency of transmitting the frame from each of the transceivers 2a to 2d can be reduced. Furthermore, the controller 33 shortens the request time period when a change in the tire air pressure occurs. Thus, the change in the tire air pressure can be confirmed in more detail. When the tire air pressure decreases, an alert can be quickly given to the user.

In the present embodiment, since the frequency of frame transmission in each of the transceivers 2a to 2d is reduced, the transmission time points of the frames in the transceivers 2a to 2d are less likely to overlap. However, in order to further reduce overlapping of the transmission time points, the controller 33 adjusts and shifts the transmission time points of the request signals to the transceivers 2a to 2d.

In the pressure detection processing, the tire air pressure is determined by performing various signal processing, calculations, and the like based on the data related to the tire air pressure stored in the frame received from the transceiver unit 32. Then, an electric signal corresponding to the determined tire air pressure is output to the display 4. For example, the controller 33 compares the determined tire air pressure with the predetermined alert threshold value Th. When the tire air pressure is detected to be equal to or lower than the predetermined alert threshold value Th, the controller 33 outputs a signal indicative of the detection result to the display 4. When the transceivers 2a to 2d detect the tire air pressures, the controller 33 informs the display 4 of the occurrence of a decrease in the tire air pressure, based on the data included in the received frame and indicating the occurrence of the decrease in the tire air pressure.

When the tire air pressures of the respective four wheels 5a to 5d are determined, the controller 33 can also output the tire air pressures onto the display 4 in association with the respective wheels 5a to 5d. The memory of the controller 33 stores the ID information about the transceivers 2a to 2d disposed in the respective wheels 5a to 5d, in association with the respective positions of the wheels 5a to 5d. Thus, the controller 33 can identify which of the wheels 5a to 5d equipped with the transceivers 2a to 2d corresponds to the received frame, by checking the received frame including the ID information, and then can identify the wheel in which the tire air pressure decreases. In this configuration, when the decrease in the tire air pressure occurs, the wheel in which the tire air pressure decreases is identified and output onto the display 4. Even when a decrease in the tire air pressure does not occur, the determined tire air pressures may be output onto the display 4 in association with the respective wheels 5a to 5d.

In this way, the display 4 is informed of the decrease in the tire air pressure of one of the four wheels 5a to 5d, or the tire air pressures of the respective four wheels 5a to 5d.

As shown in FIG. 1, the display 4 is disposed in a location capable of being seen by the driver. The display 4 may be constituted of, for example, an alarm lamp or a display installed in an instrument panel of the vehicle 1. For example, when a signal indicative of a decrease in the tire air pressure is transmitted from the controller 33 in the receiver 3, the display 4 informs the driver of the decrease in the tire air pressure by displaying the situation. Alternatively, when the display 4 is informed by the receiver 3 of the tire air pressures of the respective four wheels 5a to 5d, the tire air pressures are displayed on the display 4 in association with the respective wheels 5a to 5d.

The display 4 is used as an alert unit for alerting the driver in the present embodiment. However, a device for audibly alerting, such as a speaker, may be used as the alert unit.

As mentioned above, the tire air pressure detection device according to the present embodiment is configured. Subsequently, the operation of the tire air pressure detection device of the present embodiment will be described.

For example, when an ignition switch (not shown) is turned on, the receiver 3 and the like is activated based on the electric power supplied from the battery. Consequently, the controller 33 executes receiver processing shown in FIG. 4 every predetermined control cycle. In each of the transceivers 2a to 2d, the sensing unit 21, the controller 22, and the like are driven based on electric power supplied from the battery 24. The sensing unit 21 executes the collection of data related to the tire air pressure and the controller 22 executes various processing every predetermined control cycle. Then, the controller 22 executes the transceiver processing shown in FIG. 5.

First, the receiver processing executed by the controller 33 will be described.

Figure 4:
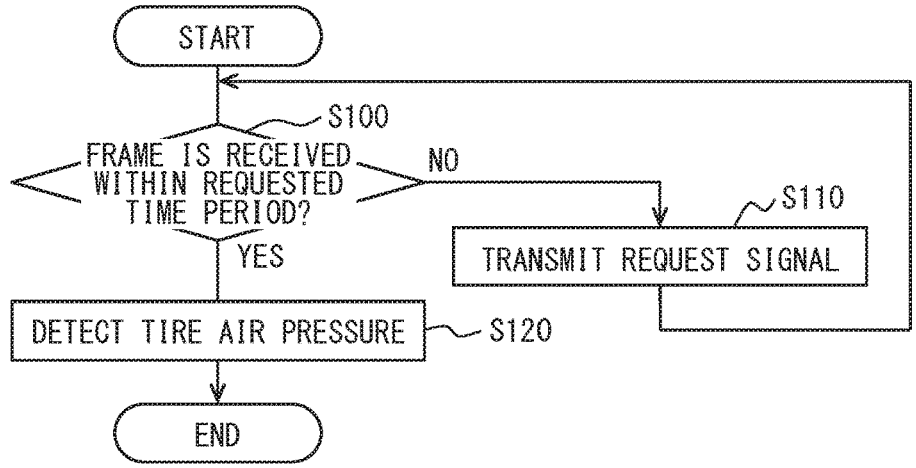
FIG. 4 is a flowchart illustrating receiver processing executed by a controller of the receiver.

As shown in FIG. 4, the controller 33 executes the reception confirmation processing in S100. That is, the controller 33 determines whether or not the frame transmitted from each of the transceivers 2a to 2d is received within the request time period. This processing is performed for each of the transceivers 2a to 2d. The controller 33 determines whether or not the frame including the ID information is received based on each of the transceivers 2a to 2d. As mentioned above, the term "required time period" as used herein is set based on the specified time period determined by the legislation or the like when the tire air pressure does not change, and is set to an even shorter time period than the specified time period when a change in the tire air pressure occurs. The request time period is set in S120 to be described later, when the receiver processing is executed in the previous control cycle.

When a negative determination is made in S100, the processing proceeds to S110. In S110, the controller 33 transmits the request signal including the ID information about one of the transceivers 2a to 2d from which the frame has not been received to the one of the transceivers 2a to 2d through the transceiver unit 32. Thereafter, the processing returns to the determination in S100, and the transmission of the request signal is repeated until the frame from each of the transceivers 2a to 2d is received.

When an affirmative determination is made in S100, the processing proceeds to S120. In S120, the controller 33 detects the tire air pressure of each of the wheels 5a to 5d based on the corresponding data related to the tire air pressure and stored in the received frame. By informing the display 4 of the detection results of the tire air pressures, the tire air pressures at that time are displayed, the decrease in the tire air pressure is displayed, or the driver is informed of the situation regarding the tire air pressure. The controller 33 also determines whether or not the tire air pressure changes. When the tire air pressure does not change, the above-mentioned "request time period" is set based on the specified time period defined by the legislation or the like. When a change in the tire air pressure occurs, the "request time period" is set to the even shorter time period than before the occurrence of the change.

Next, the transceiver processing executed by the controller 22 will be described.

Figure 5:
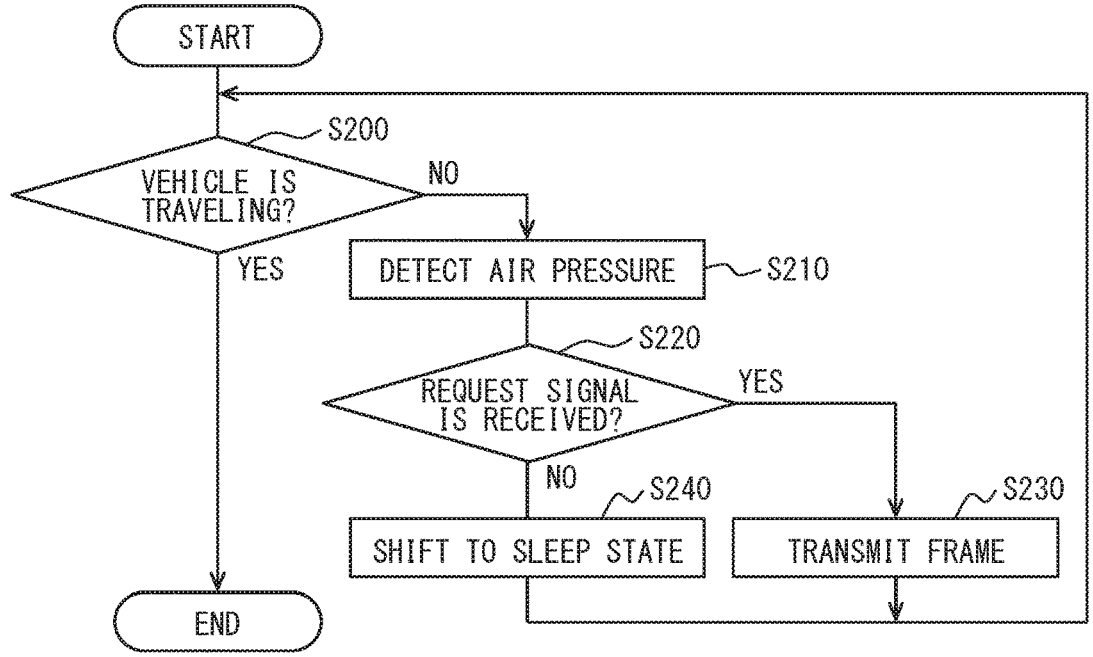
FIG. 5 is a flowchart illustrating transceiver processing executed by a controller of the transceiver.

As shown in FIG. 5, the controller 22 determines whether or not the vehicle 1 is traveling in S200. The determination is performed based on the detection signal transmitted from the acceleration sensor 21c. Since the frame transmission is not necessary, the processing is terminated when the controller 22 determines that the vehicle 1 is not traveling. When the controller 22 determines that the vehicle 1 is traveling, the processing proceeds to S210.

In S210, the controller 22 performs air pressure measurement processing. Specifically, the controller 22 creates data related to the tire air pressure based on the detection signals indicative of the detection result of the tire air pressure by the pressure sensor 21a and the detection result of the tire interior temperature by the temperature sensor 21b. The controller 22 stores the created data in the frame together with the subject ID information.

Thereafter, the processing proceeds to S220. In S220, the controller 22 determines whether or not an instruction is given from the vehicle 1, that is, whether or not a request signal for frame transmission is received from the vehicle 1. When the request signal is transmitted in S110 of FIG. 4 described above, an affirmative determination is made in S220. When the affirmative determination is made here, the processing proceeds to S230. In S230, the controller 22 transmits the frame that stores ID information and data related to the tire air pressure, as the air pressure transmission processing. After that, the processing starting from S200 is repeatedly performed, so that the frame transmission is performed by the transceivers 2a to 2d every time the request signal is transmitted.

On the other hand, when a negative determination is made in S220, the processing proceeds to S240. In S240, the controller 22 shifts to a sleep state and stops the frame transmission, thus terminating the processing.

Figure 6B:
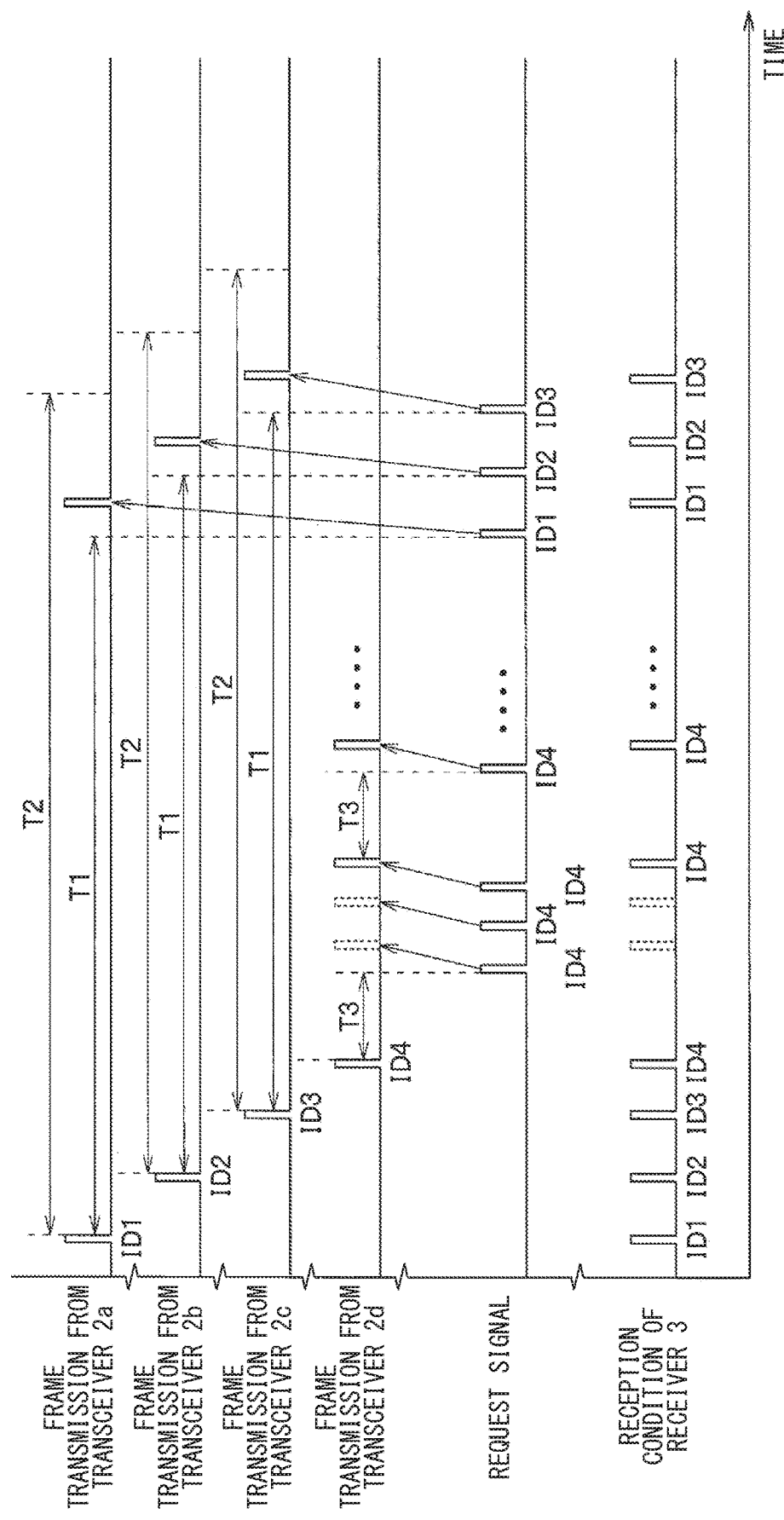
FIG. 6B is a time chart illustrating an operation example in a case where a change in the tire air pressure of one wheel occurs.

In a case where such processing is executed, the transceivers 2a to 2d and the receiver 3 operate as shown in the time charts of FIGS. 6A and 6B. To make the operations understood easily, in FIGS. 6A and 6B, the ID information about the transceivers 2a to 2d are represented as ID1 to ID4, respectively.

First, when a change in the tire air pressure does not occur, a period T1 is set as the request time period. When the request time period has elapsed after the previous frame reception from each of the transceivers 2a to 2d, the request signal with the corresponding ID information is output from the receiver 3. When receiving the request signal including the ID information, a corresponding one of the transceivers 2a to 2d transmits a frame that stores the data related to the tire air pressure in response to the received request signal.

As shown in the FIG. 6A, even when the receiver 3 does not receive the frame transmitted by the transceiver 2d, the request signal including the ID information regarding ID4 is repeatedly transmitted from the receiver 3 to the transceiver 2d. Thus, the frame reception is surely performed based on a subsequent request signal even when the frame reception has not been performed at the receiver 3 by one request signal.

The frame reception can be surely performed within the specified time period T2 that is predetermined. Therefore, the condition can be satisfied in which the data reception rate at the receiver 3 within the time period determined by the North American legislation or the like, for example, within the time of 20 minutes is equal to or more than 99%. The respective transceivers 2a to 2d transmits the frame in response to the reception of the request signal, thereby making it possible to reduce the frequency of frame transmission. Accordingly, the tire air pressure detection device can improve battery life and surely perform data reception at the receiver 3.

When the air pressure of the tire corresponding to the transceiver 2d decreases and the occurrence of the change in the tire air pressure occurs, a period T3 is set as the request time period as shown in FIG. 6B. In this case, the receiver 3 transmits the request signal at a time point when a shorter time period than the period T1 has elapsed. When receiving the request signal, the transceiver 2d transmits the frame storing the data related to the tire air pressure in response to the received request signal. Also in this case, the request signal is repeatedly transmitted from the receiver 3 until the frame reception is performed, in the same manner as before the change in the tire air pressure.

Thus, when the tire air pressure decreases, the receiver 3 can confirm the change in the tire air pressure in more detail. When the tire air pressure becomes lower than the alert threshold value Th, an alert can be quickly made to the user.

As described above, in the present embodiment, bi-directional communication is achieved between each of the transceivers 2a to 2d and the receiver 3. Thus, the transceivers 2a to 2d can transmit the frame based on the request signal from the receiver 3. When the frame cannot be received, the request signal is output from the receiver 3 again. Thus, the transceivers 2a to 2d are informed of this situation. The receiver 3 transmits the request signal every request time period set based on the specified time period defined by the legislation or the like. The frame transmission is performed by each of the transceivers 2a to 2d in response to the request signal.

In this configuration, the frame reception can be surely performed within the specified time period. The respective transceivers 2a to 2d transmit the frame in response to the reception of the request signal, thereby making it possible to reduce the frequency of frame transmission. Accordingly, the tire air pressure detection device can improve battery life and surely perform data reception at the receiver 3.

Second Embodiment

A second embodiment will be described. The present embodiment is similar to the first embodiment except for modifying the frame transmission method with respect to the first embodiment, and differences from the first embodiment will be described.

In the first embodiment described above, each of the transceivers 2a to 2d transmits the frame after receiving the request signal from the receiver 3. On the other hand, in the present embodiment, the transceivers 2a to 2d transmit the frames by themselves every request time period.

When the receiver 3 does not receive a frame after the request time period elapses, the receiver 3 transmits a request signal including the ID information to one of the transceivers 2a to 2d from which the frame is not received the request signal.

The operations in this case are represented as shown in, for example, a time chart of FIG. 7. FIG. 7 shows a case where the frame transmission is performed by each of the transceivers 2a to 2d every request time period and the receiver 3 receives each of the frames transmitted by the transceiver 2a to 2b at one time while not receiving the frame the frame transmitted by the transceiver 2d a while. In this case, the receiver 3 transmits a request signal including the ID information for ID 4 to the transceiver 2d from which the frame is not received even when the request time period elapses, and repeats the transmission of the request signal until the frame is received. In the present embodiment, the above-described configuration can obtain the similar effect to that of the first embodiment.

Third Embodiment

A third embodiment will be described. The present embodiment is similar to the first embodiment except that an instruction is given to stop the frame transmission with respect to the first embodiment, and the differences from the first embodiment will be described.

In the present embodiment, the frame transmission from the transceivers 2a to 2d is stopped in response to the receiver 3 informing the respective transceivers 2a to 2d that the frame has been received.

Specifically, the receiver 3 transmits a stop instruction signal that instructs each of the transceivers 2a to 2d to stop transmitting the frame, in addition to the request signal for each of the transceivers 2a to 2d transmitting the frame.

When a time interval during which frame reception is not performed reaches the request time period, the request signals are transmitted to the transceivers 2a to 2d. The request signals cause the transceivers 2a to 2d to repeatedly perform the frame transmission. When the receiver 3 performs the frame reception, the receiver 3 transmits the stop instruction signals to the transceivers 2a to 2d. The stop instruction signals causes the transceivers 2a to 2d to stop transmitting the frame.

The operations in this case are represented as shown in, for example, a time chart of FIG. 8. FIG. 8 shows a case where each of the transceivers 2a to 2d transmits the frame in response to the request signal, and the receiver 3 receives the frame transmitted from each of the transceiver 2a to 2b at one time while the frame transmitted by the transceiver 2d cannot be received for a while. In this case, the receiver 3 surely receives the frame transmitted from each of the transceivers 2a to 2b at one time, and causes the transceivers 2a to 2b to quickly stop transmitting the frame by transmitting the stop instruction signal. On the other hand, the receiver 3 causes the transceiver 2d to repeatedly perform the frame transmission until the receiver 3 receives the frame. Thus, the receiver 3 surely can receive the frame from the transceiver 2d, and quickly stops the frame transmission by transmitting the stop instruction signal once the receiver 3 receives the frame.

In the present embodiment, the receiver 3 transmits the stop instruction signal after receiving the frame instead of repeatedly transmitting the request signal until the receiver 3 receives the frame. The present embodiment can obtain the similar effect to that of the first embodiment.

Modification of Third Embodiment

When the frame transmission by the transceivers 2a to 2d is stopped by transmitting the stop instruction signals as described in the third embodiment, the frame transmission may be performed by each of the transceivers 2a to 2d by itself every request time period as described in the second embodiment. When the receiver 3 does not receive a frame when the request time period is reached, the receiver 3 may transmit the request signal. In this case, when the receiver 3 receives the frame, the stop instruction signal may be transmitted from the receiver 3.

The configuration may also be applied to a case where a change in the tire air pressure occurs. That is, each of the transceivers 2a to 2d can recognize the change in the tire air pressure by itself. Thus, when a change in the tire air pressure occurs in one of the transceivers 2a to 2d, the one of the transceivers 2a to 2d performs the frame transmission by itself every request time period that is shorter than that before the occurrence of the change. On the other hand, since the change in the tire air pressure can also be recognized by the receiver 3, the receiver 3 transmits the request signal when the receiver 3 cannot receive the frame transmitted from one of the transceivers 2a to 2d even after the request time period is reached. Thus, the receiver 3 can surely perform the frame reception even when a change in the tire air pressure occurs.

Furthermore, only the stop instruction signal can also be used. Specifically, the transceivers 2a to 2d perform the frame transmission by themselves every request time period, while the receiver 3 transmits the stop instruction signal when receiving the frame. The transceivers 2a to 2d repeatedly perform the frame transmission until receiving the stop instruction signals.

The operations in this case are represented as shown in, for example, a time chart of FIG. 9.

FIG. 9 shows a case where the frame transmission is performed from the transceivers 2a to 2d themselves every request time period, and each of the frames transmitted by the transceiver 2a to 2b is received in the receiver 3 at one time, while the frame transmitted by the transceiver 2d is not received for a while. In this case, the receiver 3 surely receives the frame transmitted from each of the transceivers 2a to 2b at one time, and causes the transceivers 2a to 2b to quickly stop transmitting the frame by transmitting the stop instruction signal. On the other hand, the receiver 3 surely receives the frame from the transceiver 2d by causing the transceiver 2d to repeatedly perform the frame transmission until the receiver 3 receives the frame, and quickly stops the frame transmission by transmitting the stop instruction signal once the receiver 3 receives the frame.

In this configuration, the receiver 3 can also surely perform the frame reception, and concurrently the frame transmission is stopped when the stop instruction signals are transmitted to the transceivers 2a to 2d, thereby making it possible to improve the battery life.

Other Embodiments

Although the present disclosure has been described with reference to the above-mentioned embodiments, the present disclosure is not limited to those embodiments and includes various modifications and variations thereof within the scope of equivalents. In addition, various combinations and forms of the embodiments, modifications, and variations, as well as further other combinations and forms of them with only one element more or less added therein also fall within the scope and spirit of the present disclosure.

The transceivers 2a to 2d have been described as being attached to the air injection valve. Alternatively, the transceivers 2a to 2d may be attached to other locations. The acceleration sensor 21c is not limited to one that detects the acceleration in the tire radial direction.

For example, as one of the transceivers 2a to 2d, a tire device that is called a tire mount sensor and disposed on the back surface of a tire tread can also be used. In a case where the transceivers 22a to 22d are tire mount sensors, the detection signal output from the acceleration sensor 21c can be used in the form of a detection signal that corresponds to the magnitude of a vibration in a tire tangential direction.

In this case, an output voltage waveform serving as the detection signal of the acceleration sensor 21c takes a maximum value when a portion of the tire tread corresponding to the arrangement position of the acceleration sensor 21c starts to come into contact with the ground with the rotation of the tire. The output voltage waveform takes a minimum value when the portion of the tire tread corresponding to the arrangement position of the acceleration sensor 21c comes out of contact with the ground along with the rotation of the tire. Thus, whether the vehicle is traveling can be detected based on the detection signal from the acceleration sensor 21c.

A description has been made of a case where vibration in the tire tangential direction is detected by the acceleration sensor 21c when the tire mount sensor is used as the transceivers 2a to 2d. However, the same can be performed even when vibration in another direction, for example, in the tire radial direction is detected.

In a case where the tire mount sensor is used as one of the transceivers 2a to 2d, a piezoelectric element may also be used instead of the acceleration sensor 21c. The piezoelectric element generates an output voltage corresponding to the stress, so that the output voltage that has a waveform similar to that of the acceleration sensor 21c is generated along with the deformation of the tire tread. Thus, the use of the output voltage from the piezoelectric element as the detection signal makes it possible to detect that the vehicle 1 is traveling.

In a case where the tire mount sensor is used as the transceivers 2a to 2d, the tire air pressure can be detected based on the detection signal of the acceleration sensor 21c or the piezoelectric element. That is, the length of a tire contact surface is determined by multiplying a tire rotation speed by a period of time from when the detection signal of the acceleration sensor 21c or the piezoelectric element takes the maximum value to when taking the minimum value. Because the length of the tire contact surface changes depending on the tire air pressure, the tire air pressure can be calculated based on the length of the tire contact surface. Therefore, when calculating the tire air pressure in this way, the acceleration sensor 21c or piezoelectric element functions as the pressure sensor.

In the above-mentioned first embodiment, an example has been described in which the acceleration sensor 21c detects the acceleration in the tire radial direction, that is, the acceleration in the centrifugal direction. Alternatively, the acceleration sensor 21c may detect an acceleration in the tire tangential direction. Since the acceleration in the tire tangential direction also increases or decreases with the traveling of the vehicle 1, whether the vehicle is traveling can be detected based on the acceleration in the tire tangential direction.

In the above-mentioned embodiments, the request signal is transmitted from the receiver 3 every request time period, or the frame transmission is performed from each of the transceivers 2a to 2d. However, these operations do not necessarily have to be performed at the same time intervals. That is, the receiver 3 needs to continuously perform the frame reception at each time point within the request time period.

In the above-mentioned embodiments, a portion of the tire air pressure detection device that is attached to the vehicle body 6 is collectively described as the receiver 3. However, the receiver 3 does not necessarily have to be a single component. For example, the antenna 31 and the transceiver unit 32 that serve a reception function, and the controller 33 that serves a tire air pressure detection function may be provided at different locations.

What is claimed is:

1. A tire air pressure detection device comprising:
a plurality of transceivers correspondingly provided in a plurality of wheels of a vehicle, each wheel having a tire; and
a receiver attached to a vehicle body, wherein:
each of the plurality of transceivers includes
a sensing unit having a pressure sensor configured to output a detection signal indicative of an air pressure of the tire of the corresponding wheel,
a first controller configured to process the detection signal, and generate a frame storing the processed detection signal as data related to the air pressure of the tire, and
a first transceiver unit configured to receive a request signal transmitted from the receiver, and transmit the frame in response to the request signal;
the receiver includes
a second transceiver unit configured to transmit the request signal, and receive the frame, and
a second controller configured to detect the air pressure of the tire based on the data stored in the received frame, and control the second transceiver unit to transmit the request signal;
the second controller causes the second transceiver unit to transmit the request signal to each of the plurality of transceivers at a time point within every request time period predetermined for each of the plurality of transceivers; and
the second controller causes the second transceiver unit to stop transmission of the request signal to, among the plurality of transceivers, one from which the frame has been received, and repeat transmission of the request signal to, among the plurality of transceivers, one from which the frame has not been received.

2. The tire air pressure detection device according to claim 1, wherein:
each of the plurality of transceivers transmits the frame every request time period as well as in response to the request signal; and
the second controller causes the second transceiver unit to transmit the request signal to, among the plurality of transceivers, one from which the frame has not been received when the second transceiver unit does not receive the frame every request time period.

3. The tire air pressure detection device according to claim 1, wherein
when a change in the air pressure of the tire occurs, the second controller causes the request time period to be shorter than that before the change occurs.

4. A tire air pressure detection device comprising:
a plurality of transceivers correspondingly provided in a plurality of wheels of a vehicle, each wheel having a tire; and
a receiver attached to a vehicle body, wherein:
each of the plurality of transceivers includes
a sensing unit having a pressure sensor configured to output a detection signal indicative of an air pressure of the tire of the corresponding wheel,
a first controller configured to process the detection signal, and generate a frame storing the processed detection signal as data related to the air pressure of the tire, and
a first transceiver unit configured to receive a request signal or a stop instruction signal transmitted from the receiver, and repeat transmission of the frame until receiving the stop instruction signal after receiving the request signal;
the receiver includes
a second transceiver unit configured to transmit the request signal or the stop instruction signal, and receive the frame, and
a second controller configured to detect the air pressure of the tire based on the data stored in the received frame, and control the second transceiver unit to transmit the request signal or the stop instruction signal;
the second controller causes the second transceiver unit to transmit the request signal to each of the plurality of transceivers at a time point within every request time period predetermined for each of the plurality of transceivers; and the second controller causes the second transceiver unit to transmit the stop instruction signal to, among the plurality of transceivers, one from which the frame has been received.

5. The tire air pressure detection device according to claim 4, wherein:

each of the plurality of transceivers transmits the frame every request time period as well as in response to the request signal;

the second controller causes the second transceiver unit to transmit the stop instruction signal to, among the plurality of transceivers, one from which the frame has been received when the second transceiver unit receives the frame every request time period; and the second controller causes the second transceiver unit to transmit the request signal to, among the plurality of transceivers, one from which the frame has not been received when the second transceiver unit does not receive the frame every request time period.

6. A tire air pressure detection device comprising:

a plurality of transceivers correspondingly provided in a plurality of wheels of a vehicle, each wheel having a tire; and a receiver attached to a vehicle body, wherein:

each of the plurality of transceivers includes a sensing unit having a pressure sensor configured to output a detection signal indicative of an air pressure of the tire of the corresponding wheel, a first controller configured to process the detection signal, and generate a frame storing the processed detection signal as data related to the air pressure of the tire, and a first transceiver unit configured to receive a stop instruction signal transmitted from the receiver, and repeat transmission of the frame until receiving the stop instruction signal at a time point within every predetermined request time period;

the receiver includes a second transceiver unit configured to transmit the stop instruction signal, and receive the frame, and a second controller configured to detect the air pressure of the tire based on the data stored in the received frame, and control the second transceiver unit to transmit the stop instruction signal; and the second controller causes the second transceiver unit to transmit the stop instruction signal to, among the plurality of transceivers, one from which the frame has been received.

\* \* \* \* \*